(12) United States Patent
Ha et al.

(10) Patent No.: US 11,472,459 B2
(45) Date of Patent: Oct. 18, 2022

(54) SERVING APPARATUS

(71) Applicant: Bear Robotics, Inc., Redwood City, CA (US)

(72) Inventors: John Jungwoo Ha, Redwood City, CA (US); Fangwei Li, Redwood City, CA (US); Brennand Pierce, Redwood City, CA (US); Albertus Iskandar Santoso, Redwood City, CA (US)

(73) Assignee: Bear Robotics, Inc., Readwood City, CA (US)

( * ) Notice: Subject to any disclaimer, the term of this patent is extended or adjusted under 35 U.S.C. 154(b) by 404 days.

(21) Appl. No.: 16/681,717

(22) Filed: Nov. 12, 2019

(65) Prior Publication Data

US 2021/0139065 A1 May 13, 2021

(51) Int. Cl.
| | |
|---|---|
| *B62B 3/00* | (2006.01) |
| *B62B 3/10* | (2006.01) |
| *B62B 5/00* | (2006.01) |
| *B25J 11/00* | (2006.01) |
| *B25J 5/00* | (2006.01) |

(52) U.S. Cl.
CPC .............. *B62B 3/108* (2013.01); *B25J 5/007* (2013.01); *B25J 11/008* (2013.01); *B62B 5/0026* (2013.01)

(58) Field of Classification Search
CPC ........ B62B 3/108; B62B 5/0026; B25J 5/007; B25J 11/008

USPC ........................................................ 180/89.1
See application file for complete search history.

(56) References Cited

U.S. PATENT DOCUMENTS

| | | | |
|---|---|---|---|
| 9,535,421 B1 * | 1/2017 | Canoso ............... | G05D 1/0248 |
| 10,913,160 B2 * | 2/2021 | Deyle ..................... | B25J 5/007 |
| 11,148,882 B2 * | 10/2021 | Mohan ................... | G06Q 50/28 |
| 2013/0226344 A1 * | 8/2013 | Wong ..................... | B25J 9/1697 901/1 |
| 2017/0011580 A1 * | 1/2017 | Huang ................... | G06Q 20/20 |
| 2018/0364870 A1 * | 12/2018 | Mei ....................... | B25J 11/0005 |
| 2020/0290210 A1 * | 9/2020 | Ha ......................... | B25J 11/008 |
| 2021/0212455 A1 * | 7/2021 | Jung ...................... | B60Q 3/30 |
| 2021/0402610 A1 * | 12/2021 | Lee ........................ | B25J 19/023 |

FOREIGN PATENT DOCUMENTS

| | | |
|---|---|---|
| KR | 20100110143 A | 10/2010 |
| KR | 1020190106904 A | 9/2019 |
| KR | 1020190106910 A | 9/2019 |

* cited by examiner

*Primary Examiner* — James A Shriver, II
*Assistant Examiner* — Hilary L Johns
(74) *Attorney, Agent, or Firm* — Dinsmore & Shohl LLP; Yongsok Choi, Esq.

(57) ABSTRACT

The present invention relates to a serving apparatus. According to one aspect of the invention, there is provided a serving apparatus, comprising: a driving unit; a body unit connecting to the driving unit and having a top side and an interior, wherein at least a part of a lateral side of the body unit is open; and a body container disposed in the interior of the body unit, wherein food or food containers are placed at the body container and the top side.

7 Claims, 9 Drawing Sheets

-- Prior Art --

SERVING APPARATUS

FIELD OF THE INVENTION

The present invention relates to a serving apparatus.

BACKGROUND

Serving means providing drinks or food to customers in restaurants and the like.

In recent years, serving robots and the like have been developed to work replacing or assisting waiters or waitresses. Such a serving robot usually functions to take food orders or carry out serving according to the orders, and may perform autonomous navigation using information on customers (e.g., table position information). The serving robot may comprise a transport means (including sensors for avoiding obstacles), a display means for menu output or order input, and the like. Further, the serving robot may include an arrangement for placing or carrying food or food containers.

As the related prior art, the disclosures of Korean Patent Application No. 10-2009-0028566 (titled "Robot System for Restaurant Serving") will be first discussed (the description of reference numerals will be omitted in the following). FIG. 1 (which is identical to FIG. 1 of the above Korean patent application) shows that a robot arm holds a tray used to carry a container (such as a dish containing food) or other objects required for service. As such, it is very complicated to configure the robot arm to hold the tray, to maintain a stable holding state while the robot travels, and to release the holding state when the robot reaches a customer's table. Particularly, the tray-holding robot arm having the complicated configuration and the associated components do not only cause an increase in the costs of manufacturing the robot by drastically increasing the number of parts that should be precisely controlled, but also cause an increase in the likelihood of service failure due to control errors (e.g., falling down of food containers placed on the tray, or food spilling out of the container).

FIG. 2 shows the configuration of a serving robot which is different from that of the robot of the prior art shown in FIG. 1. Unlike the robot shown in FIG. 1, the serving robot of FIG. 2 adopts the configuration in which a tray can be placed at the top of the robot's body without using a robot arm. The serving robot of FIG. 2 has already been commercialized under the name Dilly.

The configuration of the serving robot of FIG. 2 will be discussed in more detail below. Reference numeral 10' denotes a driving unit. The driving unit 10' includes an electric motor driven by a rechargeable battery, wheels driven by the electric motor, a means for steering of the wheels, and the like. The wheels of the driving unit 10' are covered by a housing as much as possible so as not to be exposed to the outside. A body unit 20' is mounted at the top of the driving unit 10'. An empty space is formed inside the body unit 20' to accommodate sensors for avoiding obstacles, wires and the like. A sensor indicated by reference numeral 1 is a visual sensor (i.e., a camera) and a sensor indicated by reference numeral 2 is a lidar. Although the serving robot shown in FIG. 2 may include a plurality of sensors as described above, such a plurality of sensors are not necessarily required for navigation to avoid obstacles. For example, the same purpose can be accomplished only with a depth camera.

Meanwhile, an exposed accommodation structure for stably supporting a tray 3 for carrying food is formed at the top of the body unit 20' of the serving robot of FIG. 2. The seating of the food on the serving robot is completed by simply placing the tray 3 carrying the food on the accommodation structure at the top of the body unit 20'. That is, no fastening structure is required between the tray 3 and the accommodation structure at the top of the body unit 20'. Instead, the accommodation structure at the top of the body unit 20' may include tray catches arranged at predetermined intervals along the outer periphery of the accommodation structure, so that the tray 3 does not fall out of the accommodation structure in spite of vibration generated during normal navigation of the serving robot.

The inventor(s) have recognized the following problems in connection with the configurations of the above two conventional robots.

The first is the lack of space. The tray held by the robot arm can carry a quite small amount of food. Likewise, the tray placed on the accommodation structure at the top of the body unit can carry a small amount of food.

The second is that there are limitations in improving the stability of food containers of various sizes and shapes. Since the food containers of various sizes and shapes are placed on a flat tray without distinction, it is impossible to accommodate food containers of specific sizes and shapes more stably.

The third is the problem related to collecting used food containers. If the used food containers are carried on the serving robot and moved to a place for dishwashing as they are exposed to the outside, hygiene issues may be caused and customers may experience significant discomfort.

In order to solve the above problems, the present inventor(s) have developed and tested various configurations of a serving apparatus, and consequently have attained the present invention.

SUMMARY OF THE INVENTION

One object of the present invention is to solve all the above-described problems in the prior art.

Another object of the invention is to increase the amount of carriable food without causing significant changes to the configuration of a serving apparatus, to handle food containers of particular sizes and shapes more stably, and to minimize the outside exposure of used food containers when collecting them.

Yet another object of the invention is to serve food and collect used food containers only with a single round trip of a serving apparatus, while maintaining hygiene levels.

The representative configurations of the invention to achieve the above objects are described below.

According to one aspect of the invention, there is provided a serving apparatus, comprising: a driving unit; a body unit connecting to the driving unit and having a top side and an interior, wherein at least a part of a lateral side of the body unit is open; and a body container disposed in the interior of the body unit, wherein food or food containers are placed at the body container and the top side.

In addition, there may be further provided other serving apparatuses according to the technical idea of the invention.

According to the invention, it is possible to increase the amount of carriable food without causing significant changes to the configuration of a serving apparatus.

According to the invention, it is possible to handle food containers of particular sizes and shapes more stably.

According to the invention, it is possible to minimize the outside exposure of used food containers when collecting them.

According to the invention, it is possible to serve food and collect used food containers only with a single round trip of a serving apparatus, while maintaining hygiene levels.

DETAILED DESCRIPTION

Figure 1:
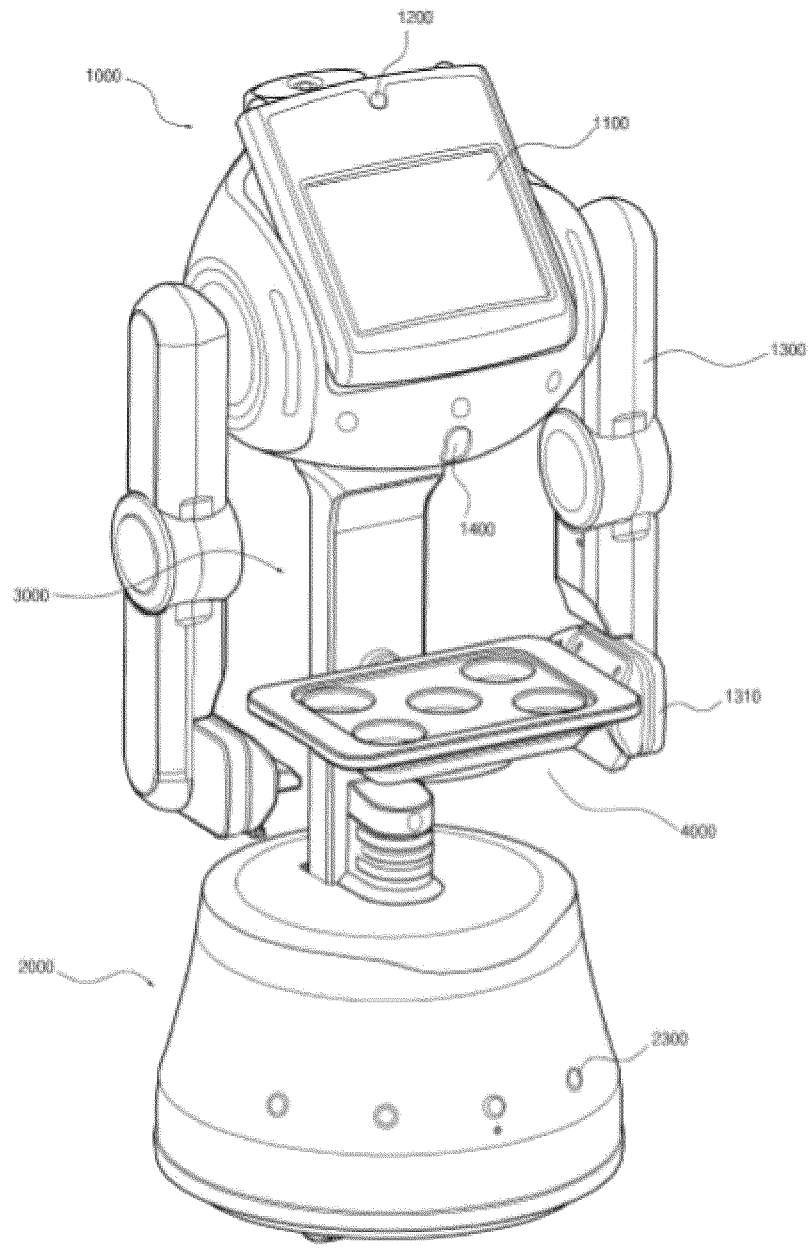
FIG. 1 is FIG. 1 of Korean Patent Application No. 10-2009-0028566.
Figure 2:
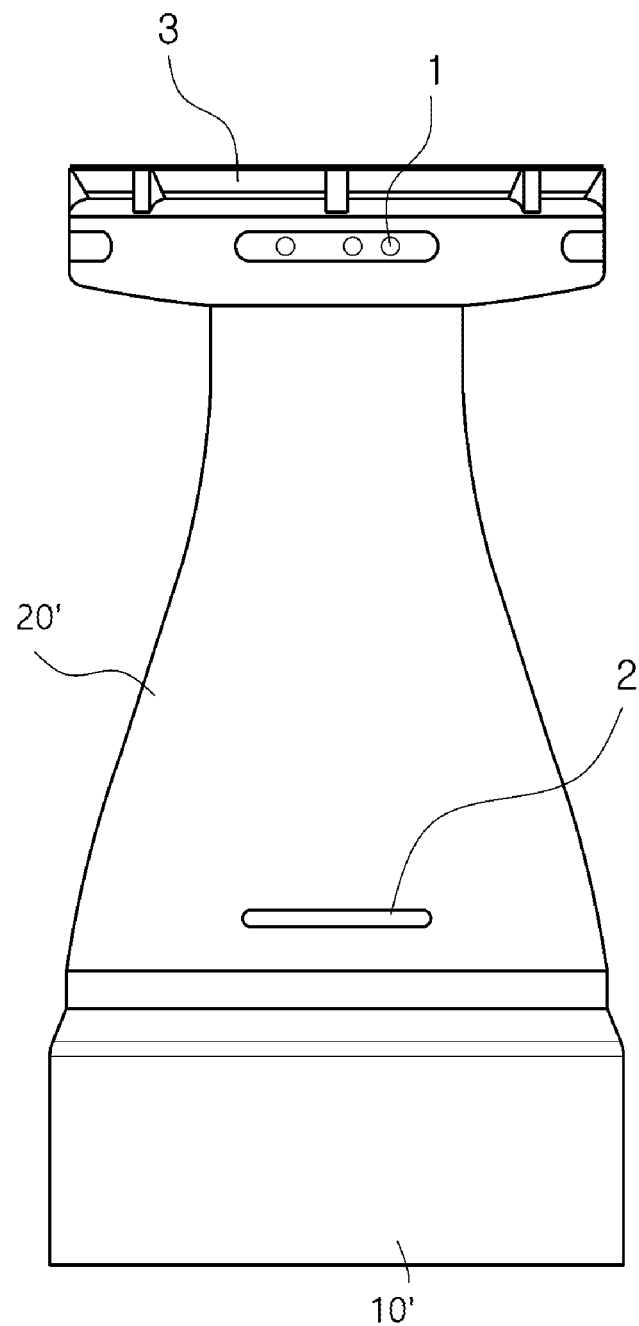
FIG. 2 shows the configuration of a serving robot which is different from that of a robot of the prior art shown in FIG. 1.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each of the embodiments may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Figure 3:
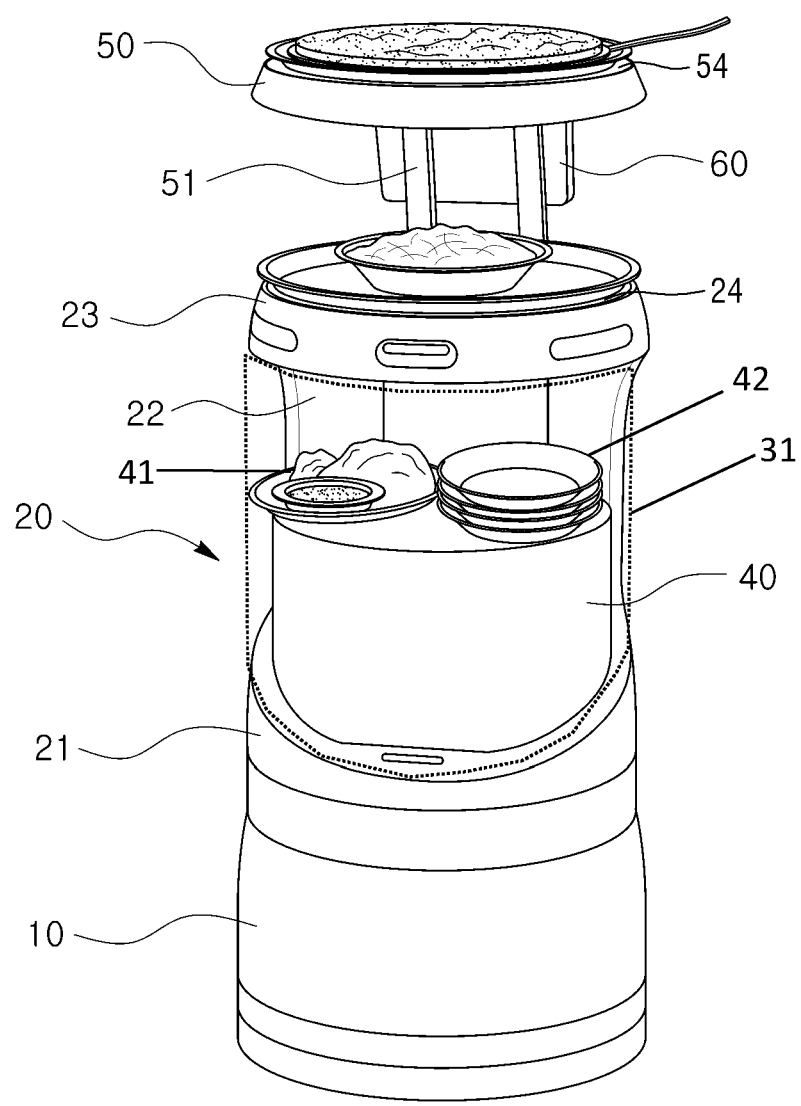
FIG. 3 shows a serving apparatus according to one embodiment of the invention.

FIG. 3 shows a serving apparatus according to one embodiment of the invention. The serving apparatus may be implemented as a robot like the robot of the prior art, but may also be implemented as a serving cart or the like having a more traditional driving means and control means, or as a serving drone having a flying means.

In FIG. 3, the component indicated by reference numeral 10 is a driving unit. The driving unit 10 may include an electric motor driven by a rechargeable battery, wheels driven by the electric motor, a means for steering of the wheels, and the like. The wheels of the driving unit 10 may be covered by a housing as much as possible so as not to be exposed to the outside.

A body unit 20 may be mounted at the top of the driving unit 10. At least a part of a lateral side of the body unit 20 may be open and an empty space may be formed inside the body unit 20 (e.g., a space 31 may be formed between a lower body part 21 and an upper body part 23 to be described below). Specifically, the body unit 20 may include a lower body part 21 mounted and fixed at the top of the driving unit 10, pillars 22 extending upward from the outer periphery of the lower body part 21, and an upper body part 23 connected to the lower body part 21 and supported by the pillars 22. The lower body part 21, the pillars 22, and the upper body part 23 may be assembled structures or may be integrally formed. The portion without the pillars 22 in the lateral side of the body unit 20 may be open. The upper body part 23 may have a flat top side 24, and a tray on which food containers may be placed may be disposed on the top side 24 as shown. The tray may be a common tray used in restaurants, or may be a special one having a shape or structure such that it may be more stably disposed on the upper body part 23.

Through the open lateral side of the body unit 20, a body container 40 may be disposed in or taken out of the body unit 20. The body container 40 may have a shape similar to a basket, such that an empty space is formed therein; a lateral side thereof is closed; a top side thereof is open; and a bottom side thereof is closed. The shape of the body container 40 may be easily recognized with reference to FIG. 5.

Figure 5:
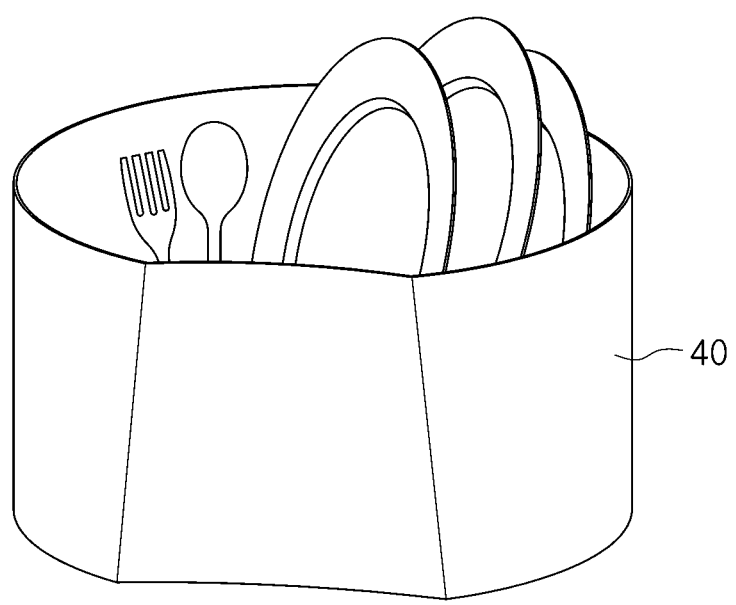
FIG. 5 shows a state in which a body container according to one embodiment of the invention is used for collecting food containers.

The body container 40 may be disposed in the body unit 20 in two states. In FIG. 3, the body container 40 is disposed in a first state. That is, the body container 40 may be disposed upside down such that the bottom (closed) side of the body container 40 faces upward to support food 41 or food containers 42. In FIG. 5, it is disposed in a second state. That is, the body container 40 may be disposed such that the top (open) side of the body container 40 faces upward to accommodate used food containers. The first state may be a state of the body container 40 when food is served, and the second state may be a state of the body container 40 when used food containers are collected.

In FIG. 3, the component indicated by reference numeral 50 is an extension unit. The extension unit 50 may include removable pillars 51 that may be connected to the upper body part 23. This connection may be a removable connection. The extension unit 50 preferably includes a flat top side 54, and the tray may be placed on the top side 54 as shown in FIG. 3. Meanwhile, the extension unit 50 may also function to cover the upper parts of food containers disposed on the upper body part 23. Unlike the illustration, the extension unit 50 may be formed in several layers or may include a dedicated part for the placement of objects other than food containers. For example, the extension unit 50 may integrally or separately include a cylindrical housing having an open top side, which may accommodate forks, knives and the like.

In the embodiment of FIG. 3, a tablet 60, which may be used by a customer or a user of the serving apparatus in inputting various commands, may be attached to the removable pillars 51 of the extension unit 50. The tablet 60 may communicate with the driving unit 10 in a wired or wireless manner. In the embodiment of FIG. 3, the location to which the tablet 60 is attached is only exemplary, and a part for the placement of the tablet 60 may be located anywhere in the serving apparatus and even outside the serving apparatus. Meanwhile, a smart phone, a personal computer, a POS (Point-Of-Sale) device and the like may be used instead of the tablet 60.

Thus, according to the embodiment of FIG. 3, three serving spaces, i.e., a space above the closed side of the body container 40 in the body unit 20 (when the body container 40 is in the first state), a space above the top side 24 of the upper body part 23, and a space above the top side 54 of the extension unit 50 may be provided when food is served. Meanwhile, three spaces, i.e., the interior of the body container 40 in the body unit 20 (when the body container 40 is in the second state), the space above the top side 24 of the upper body part 23, and the space above the top side 54 of the extension unit 50 may be provided when used food containers are collected. Two spaces are provided when the extension unit 50 is removed. The number of provided spaces may increase when the extension unit 50 has several layers.

Figure 4:
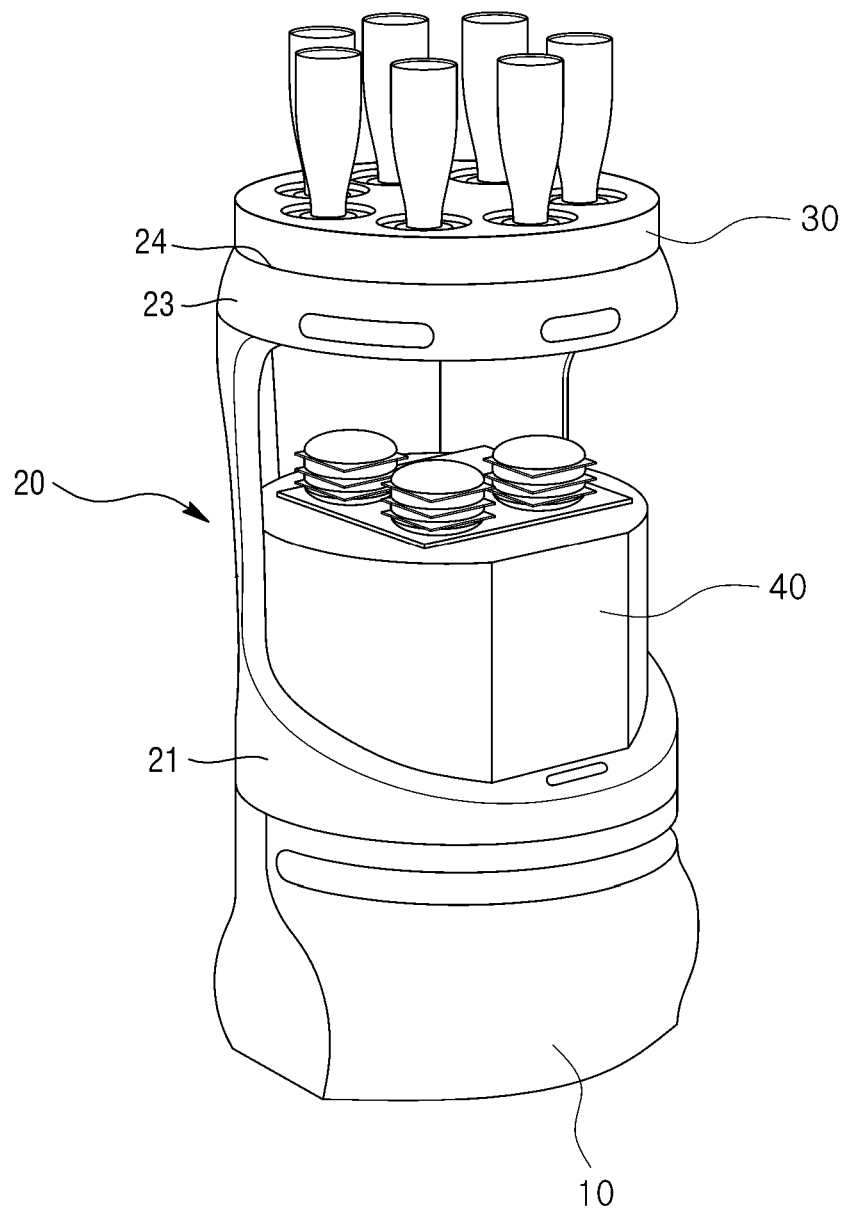
FIG. 4 shows a situation in which a dedicated drink tray is disposed on a body unit of a serving apparatus according to one embodiment of the invention.

FIG. 4 shows a situation in which a dedicated drink tray 30 is disposed on the body unit 20 of the serving apparatus according to one embodiment of the invention. In this embodiment, the configurations of the driving unit 10, the body unit 20, and the body container 40 disposed in the first state through the open lateral side of the body unit 20 are the same as in the embodiment of FIG. 3. The dedicated drink tray 30 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Meanwhile, a dish containing a hamburger, for example, may be disposed on the closed side of the body container 40. That is, it can be seen that a drink that spills more easily may be placed in the dedicated drink tray 30 and food that spills less easily may be placed on the closed side of the body container 40. The dedicated drink tray 30 may be disposed on the body unit 20 or elsewhere, for example, on the closed side of the body container 40 or on some extended components, depending on its use and configuration.

Meanwhile, although the configuration in which the dedicated drink tray 30 includes a plurality of circular grooves has been described with reference to FIG. 4, various other configurations for holding cups (e.g., by using magnetic force between the cups and the dedicated drink tray 30 or fixing the cups with mechanical parts (such as clasps or rubber pads) rather than grooves) may be employed.

FIG. 5 shows a state in which the body container 40 according to one embodiment of the invention is used for collecting food containers (i.e., the second state). The lateral side of the body container 40 may be formed tall enough so that used food containers and food remaining therein are not easily visible from the outside. Further, if the used food containers are accommodated in the body container 40 and then covered with a lid, cloth, paper towel, or the like, it is possible to prevent the discomfort experienced by other customers who have not used the food containers. Meanwhile, the tall side or the lid as above may prevent the falling of the remaining food to the floor of the restaurant. Meanwhile, the second state of the body container 40 may be used for carrying garbage depending on the type of restaurant.

Figure 6:
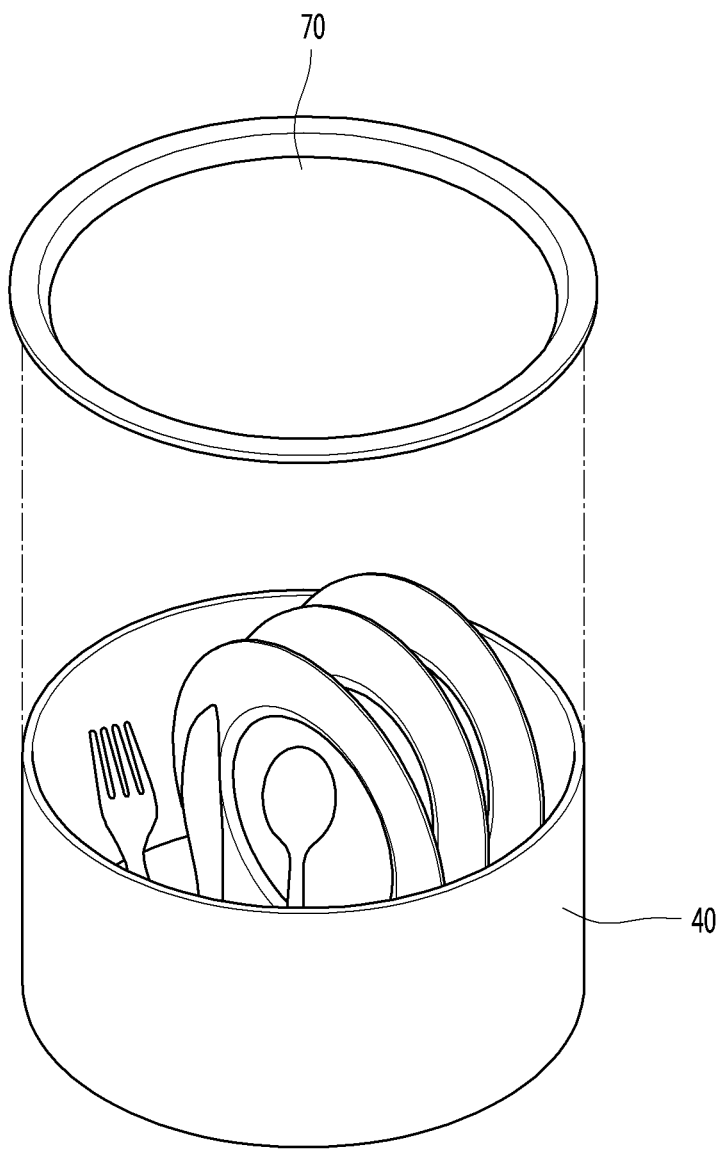
FIG. 6 shows an example of utilizing a lid.
Figure 7:
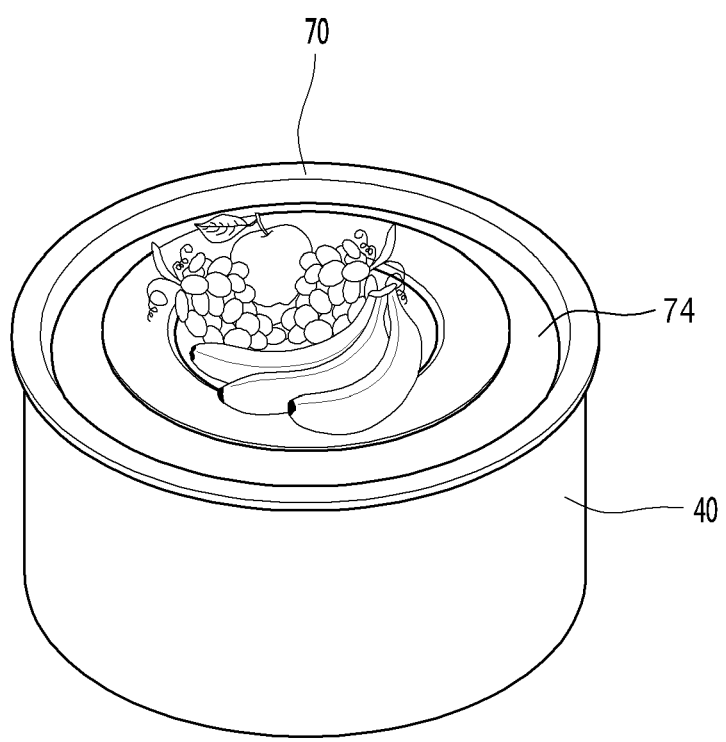
FIG. 7 shows an example of utilizing a lid.
Figure 8:
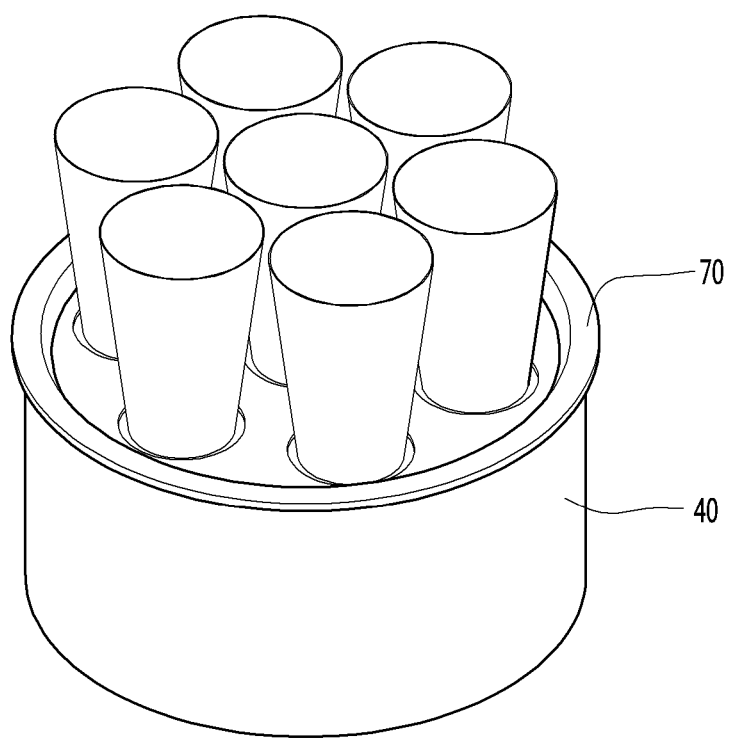
FIG. 8 shows an example of utilizing a lid.

FIGS. 6 to 8 show examples of utilizing the above-described lid.

FIG. 6 illustratively shows that a lid 70 covers the open top side of the body container 40.

FIG. 7 illustratively shows that when the lid 70 has a flat top surface 74, a dish containing food is placed on the above surface 74 in a state in which the lid 70 is used for the body container 40.

FIG. 8 illustratively shows that when the lid has a surface including a plurality of grooves for fixing a plurality of cups, the plurality of cups are placed on the above surface in a state in which the lid 70 is used for the body container 40.

Thus, those skilled in the art will appreciate that the lid 70 of the body container 40 may be used, for example, in serving of food containers.

Figure 9:
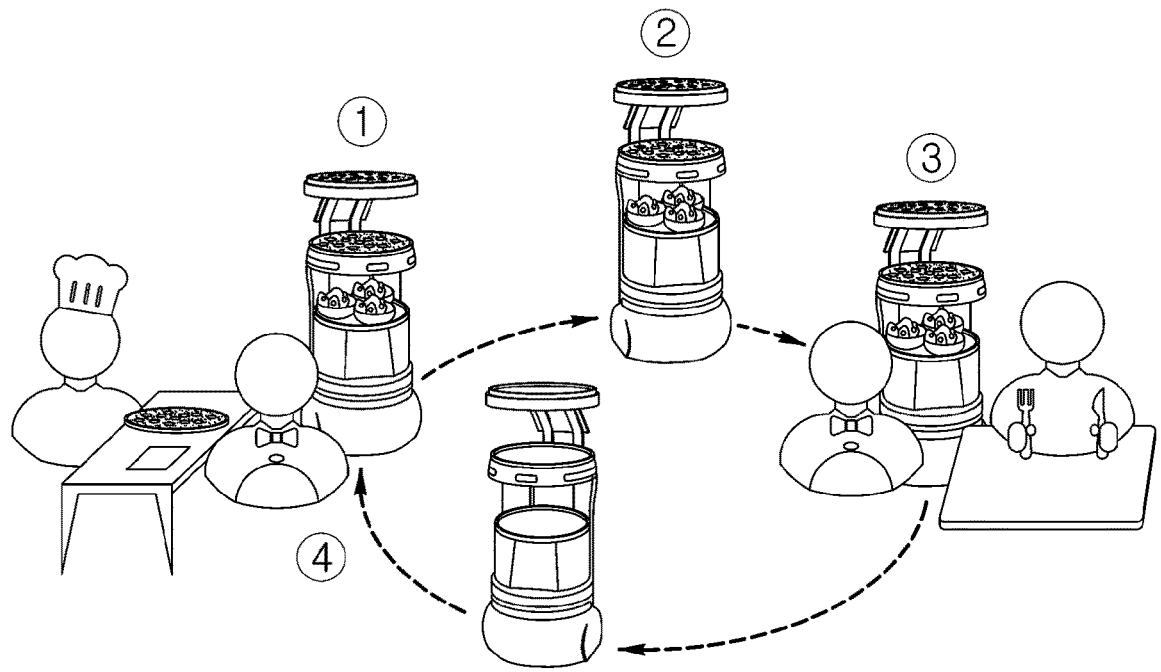
FIG. 9 shows an exemplary serving process performed by a serving apparatus according to one embodiment of the invention.

FIG. 9 shows an exemplary serving process performed by the serving apparatus according to one embodiment of the invention.

In step 1 of FIG. 9, an employee of a restaurant places food in each space of the serving apparatus, and then enters a table number using the tablet 60 of the serving apparatus. In step 2, the serving apparatus travels safely toward the table of the number entered in step 1. In step 3, a customer or employee moves the served food onto the table. When the above process is finished, the serving apparatus returns to a kitchen in step 4. The serving apparatus waits for the next task.

The serving process as described above may be similarly applied when food containers are collected from the table where dining is finished. In this case, in step 1, an employee sets the serving apparatus to a collection mode, and enters the number of the table where dining is finished using the tablet 60 of the serving apparatus. Here, the setting to the collection mode may include disposing the body container 40 of the body unit 20 in the second state, placing a tray having a configuration suitable for collection on the upper body part 23 of the body unit 20, and the like. In step 2, the serving apparatus travels safely toward the table of the number entered in step 1. In step 3, the used food containers are accommodated in the body container 40 by an employee. The lid 70 may be used after the accommodation. However, the food containers in a relatively clean state may be disposed on the top side 24 of the upper body part 23 or the top side 54 of the extension unit 50, if necessary. When the above process is finished, the serving apparatus returns to the kitchen for dishwashing in step 4. The serving apparatus waits for the next task.

In the above description of FIG. 9, the operation examples of the serving apparatus have been described with respect to the serving situation and the collection situation, respectively. However, the serving apparatus according to one embodiment of the invention does not necessarily operate according to the above examples. It should be understood that these examples do not limit the manner in which the serving apparatus operates.

Further, all trays and food containers used in connection with the serving apparatus of the invention may be washed by a general dishwasher available in general consumer markets, a commercial dishwasher capable of rinsing, washing and sterilizing, or the like, and may preferably be manufactured such that they can be sanitized in compliance with restaurant hygiene regulations.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A serving apparatus, comprising:
   a driving unit;
   a body unit including a lower body part connecting to the driving unit, an upper body part connecting to the lower body part and having a top side, and an interior that is a space formed between the lower body part and the upper body part, wherein at least a part of the interior is open; and
   a body container disposed in the interior of the body unit,
   wherein food or food containers are placed at the body container and the top side,
   wherein the body container is capable of being disposed in the interior of the body unit in a first state or a second state,
   wherein in the first state, the body container is disposed upside down such that a closed side of the body container faces upward to support food or food containers, and
   wherein in the second state, the body container is disposed such that an open side of the body container faces upward to accommodate used food containers.

2. The serving apparatus of claim 1, wherein the first state is applied when food is served, and the second state is applied when used food containers are collected.

3. The serving apparatus of claim 2, wherein in the second state of the body container, the body container is covered with a lid, and a top surface of the lid is used for placement of other food or other food containers.

4. The serving apparatus of claim 1, further comprising:
   an extension unit capable of removably connecting to the body unit.

5. The serving apparatus of claim 4, wherein a top side of the extension unit is used for placement of other food or other food containers.

6. The serving apparatus of claim 1, further comprising:
   a dedicated tray for specific food containers, wherein the dedicated tray is disposed at the top side of the body unit.

7. The serving apparatus of claim 5, further comprising:
   a dedicated tray for specific food containers, wherein the dedicated tray is disposed at the top side of the extension unit.

* * * * *